United States Patent Office 3,477,917
Patented Nov. 11, 1969

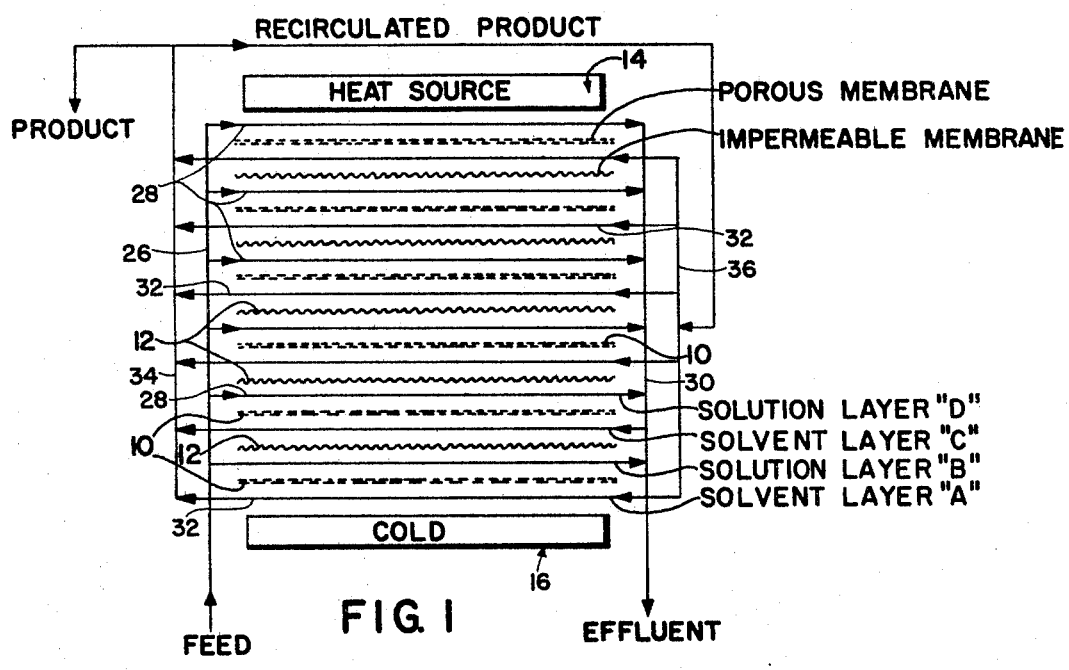
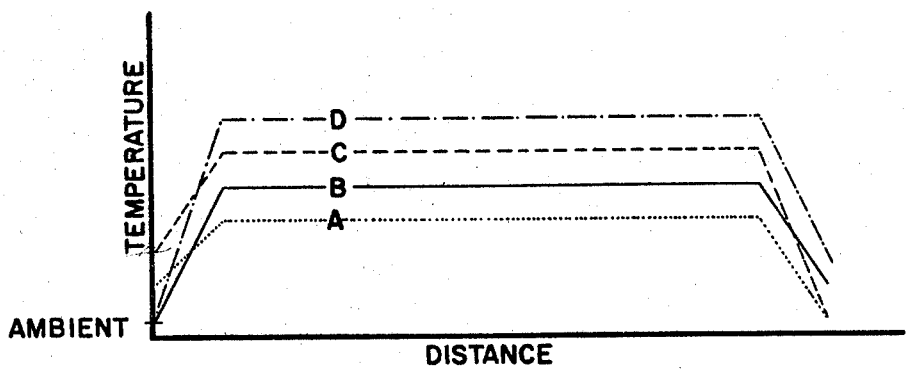

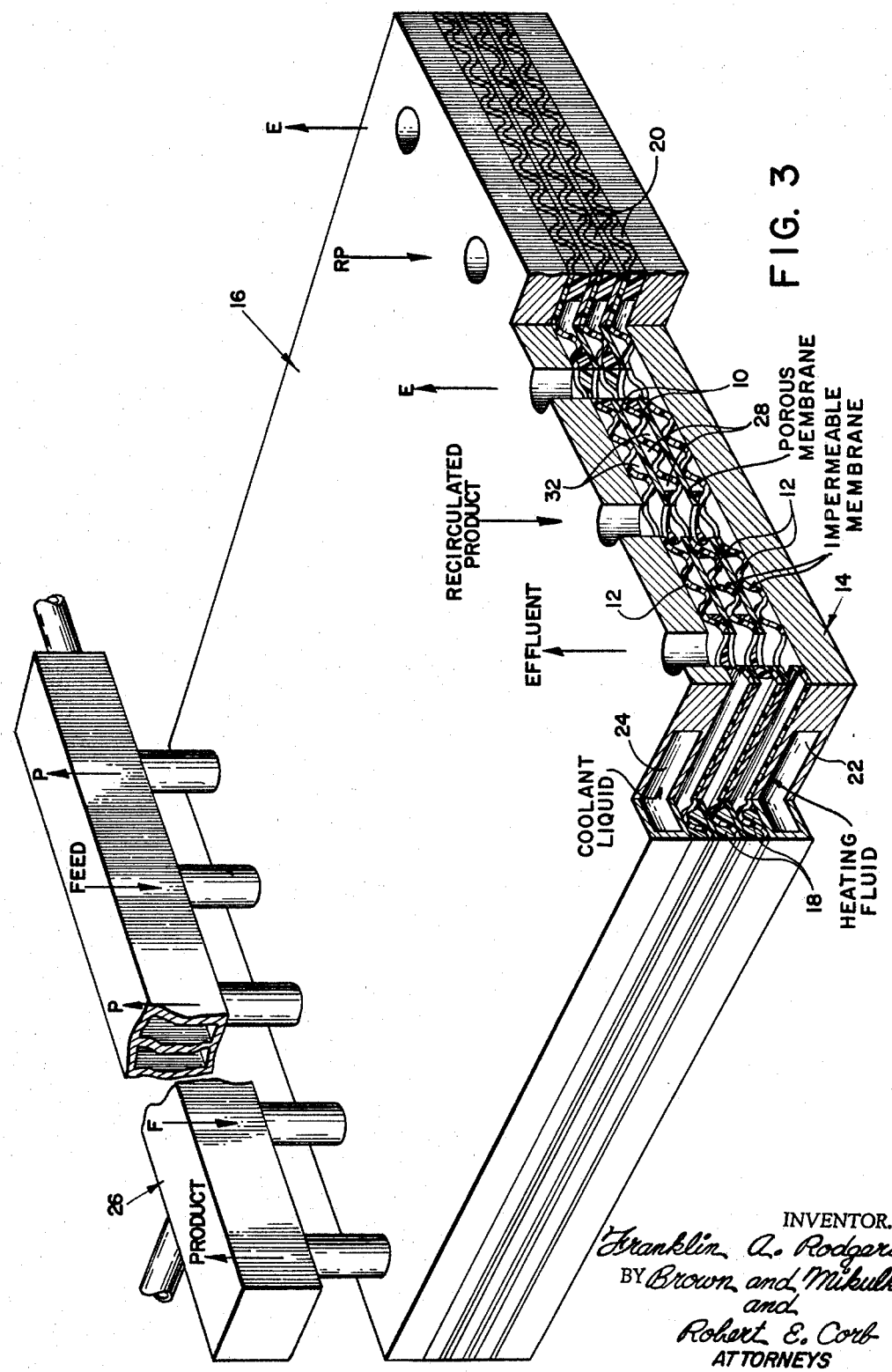

3,477,917
MULTIPLE EFFECT DISTILLATION WITH MICROPOROUS MEMBRANES AND DISTILLATE RECIRCULATION
Franklin A. Rodgers, Cambridge, Mass., assignor to Pactide Corporation, Cambridge, Mass., a corporation of Delaware
Continuation-in-part of application Ser. No. 531,463, Mar. 3, 1966. This application Aug. 28, 1968, Ser. No. 756,070
Int. Cl. C02b *1/04;* B01d *3/14*
U.S. Cl. 203—10
18 Claims

ABSTRACT OF THE DISCLOSURE

Distillation apparatus in which a liquid composition and a vaporizable liquid or distillate extracted from said liquid composition are counterflowed through channels on opposite sides of a microporous membrane, heat is transferred to the liquid composition to vaporize the liquid and heat is transferred from the distillate liquid to transfer the vapor through the membrane and condense the vapor. Internal heat exchange between effluent liquid composition and incoming liquid composition is achieved by recirculating through each distillate channel a portion of the distillate liquid withdrawn therefrom.

---

This invention is a continuation-in-part of my copending application Ser. No. 531,463, filed Mar. 3, 1966, now abandoned.

This invention relates to distillation apparatus and methods and particularly to novel and improved methods of heat exchange and multiple effect distillation apparatus incorporating improved heat exchange means.

In the copending U.S. patent application of Franklin A. Rodgers, Ser. No. 456,040, filed May 7, 1965, now abandoned, there is shown and described a multiple effect still comprising a succession of liquid and heat exchange stages in each of which heat is transferred to a solution to vaporize the solvent and the vapor is transferred across a barrier where it is condensed to form a body of solvent from which heat is transferred to a succeeding body of solution. A solution including a vaporizable solvent to be extracted as the desired product, is introduced into the still as the distilland; the final product of the distillation process is the distillate or solvent; and the effluent is in the form of concentrated solution. During the distillation process, heat is transferred to the distilland solution in each distillation stage of the apparatus so if the heat contained in the effluent leaving each stage is not to be wasted, it must be transferred to the incoming feed liquid.

Other objects of the present invention are: to provide a method of distillation including internal heat exchange between effluent and distilland; to provide novel and improved multiple stage distillation apparatus in which substantially all of the requisite heat exchange between effluent solutions and feed solutions is effected internally; to provide distillation apparatus described in which internal heat exchange between effluent and feed liquids is effected by a relatively small portion of each distillation stage; and to provide a still of the type described in which heat exchange between effluent and feed liquids is achieved internally by recirculating a part of the product liquid through each distillation stage counter to the direction of flow of the feed and effluent liquids.

Another object of the invention is to provide multiple stage distillation apparatus for achieving internal heat exchange between effluent and product liquids more efficiently and with an overall structure substantially less expensive than distillation systems provided with external heat exchange.

Other objects of the invention will in part be obvious and will in part appear hereinafter.

The invention accordingly comprises the apparatus possessing the construction, combination of elements and arrangement of parts and the method involving the several steps and the relation and order of one or more of such steps with respect to each of the others, which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a schematic representation of a multiple stage still incorporating provision for internal heat exchange between product and effluent liquids;

FIG. 2 is a diagram of the temperature gradients within the still of FIG. 1, illustrating the method of the invention; and FIG. 3 is a perspective view, partially in section, showing a still embodying the invention.

Although the distillation apparatus described in the aforementioned Rodgers' application may take a number of different forms, the essential components of a multiple stage still constructed according to this application remain the same and are illustrated in FIGS. 1 and 3 as including a plurality of stages, each comprising a porous membrane for passing only gas, including the vapor of a liquid (solvent), and a liquid and vapor impermeable membrane disposed between adjacent porous membranes to form channels adjacent opposite sides of each porous membrane; means for circulating a feed liquid (solution) through the channels in contact with one side of each porous membrane; means for transferring heat to the feed solution to vaporize the solvent; means for transferring heat from the condensate in the channel on the opposite side of each membrane; and means for withdrawing the condensate from the last-mentioned channels. Each stage comprises separate porous and impermeable membranes and a plurality of membranes are assembled in alternate, stacked relation between a source of heat and means for withdrawing heat from the assembly, to form the still shown schematically in FIG. 1. The feed liquid is introduced at one side of the assembly and is circulated as thin layers through the channels on the sides of the porous membranes facing the heat source toward the opposite side of the assembly. The product or condensate collects as thin layers on the opposite sides of the porous membranes, that is, on the sides facing the means for transferring heat from the assembly, and is withdrawn from the channels at the same side of the assembly that the feed liquid is introduced so that circulation of the feed liquid is counter to circulation of the condensate liquid. Heat is transferred from the condensate of each stage across an impermeable membrane to the layer of feed liquid of the next succeeding stage to vaporize the latter.

A still providing for internal heat exchange between effluent and feed liquids is shown in FIGS. 1 and 3 as comprising a multiplicity of porous membranes 10 and impermeable membranes 12 arranged in alternating, stacked relation. The membranes are preferably rectangular in shape, all of the same size, and are secured together with gaskets 18 and 20 at their lateral and end margins respectively to form shallow channels for containing liquids in the form of thin films or layers. The stack of membranes is secured between a source of heat, such as a block 14 or other means providing a channel 22 through which a heated fluid, e.g., steam, is circulated; and means such as another block 16 providing a channel 24 through which a coolant fluid (e.g., water) is circulated, located at the opposite end of the stack. The feed liquid may be circulated through the cooling block as the coolant fluid and thereby provide for additional heat transfer to the feed liquid. The still shown in the drawings may be oriented in any position during operation without affecting its operation or the efficiency thereof.

As noted in the aforementioned Rodgers application Ser. No. 456,040, the microporous membrane may be formed of an organic plastic material which is insoluble in the liquid, e.g. water, and is able to withstand the operating temperatures encountered. For distillation apparatus designed to produce demineralized water, useful plastics include, for example, polyvinyl chloride, cellulose nitrate, cellulose acetate, cellulose triacetate, and polytetrafluoroethylene. The porous plastic membrane may be inherently non-wettable by the liquid, or it may be treated in such a way as to render the surface thereof, including the pores, non-wetting. For example, a cellulose acetate porous membrane for use in the distillation of water may be coated with a silicone water repellant such as sold by General Electric Company under the trade name "Dri-Film" No. 1040 or No. 1042, or designated SS4029. The porous membrane itself should be as thin as possible, consistent with the physical strength necessary to remain intact in the operating conditions of the apparatus and, in a preferred embodiment, ranging from 0.002 to 0.006 inch thick. Examples of microporous films useful in the method of the invention for purifying water include a microporous filter media sold by Gilman Filter Company having a pore size of approximately 0.45 micron and a thickness of 0.005 inch and designated:

GM-6 (cellulose acetate)
GA-6 (cellulose triacetate)
VM-6 (polyvinyl chloride)
VNW-450 (nylon supported polyvinyl chloride)
Alpha-6 (regenerated cellulose)

Similar microporous filter media are sold by Millipore Filter Corporation under the trademark "Standard MF" and "Microweb" and have thicknesses of approximately 0.006 inch and pore sizes with effective diameters of 0.45 micron. These and similar materials are particularly desirable because they exhibit a high degree of uniformity in pore size, the pores represent the major proportion of the total volume of the membrane, and the membranes exhibit relatively poor thermal conductivity.

The impermeable membrane may be formed of a thin sheet material including metals such as copper and aluminum having heat conducting properties or organic plastics which are compatible with the liquids and have the requisite structural strength at the operating conditions of temperature and pressure. For distillation apparatus designed to purify saline water, typical polymeric materials useful for the impermeable membranes include the polycarbonates, polyesters, polyethylenes, polypropylene, and halogenated polyethylenes, particularly fluorocarbons such as polyvinylidene fluoride.

The feed liquid or solution is introduced by way of a suitable manifold 26 or the like into each channel designated 28 in contact with the side of a porous membrane facing the heat source at one side of the assembly of stacked membranes and is caused to flow (from left to right as shown in FIG. 1 in which direction of liquid flow is indicated by arrowheads) through the channel to the opposite side of the assembly where the now concentrated solution or effluent is withdrawn by way of a suitable manifold 30. It should be noted that flow of the solution through the different stages is parallel. As the liquid (solution) passes as a thin film through each channel, the solvent is vaporized and the vapors pass through the adjacent porous membrane toward the colder side thereof and condense in the channel designated 32 on the opposite side of the porous membrane.

The condensate (solvent) is withdrawn by way of suitable means such as a manifold 34 from the condensate channels 32 on the cold sides of the porous membranes at the same side of the assembly as the feed is introduced so that condensate or product flow is in a direction opposite to the direction of flow of the feed and effluent. Heat from each layer of condensate liquid is transferred by conduction through an impermeable membrane toward the cold side of the assembly to the next adjacent layer of feed liquid to vaporize the latter.

In a still of this type having no provision for internal exchange, the feed liquid would enter each stage at a temperature approximating the ambient temperature, or at a slightly higher temperature if it has been employed to transfer heat from the still at the cold end thereof; and, the temperature of the feed liquid in each stage would rise rapidly to a level that remains substantially constant during flow of the liquid, as a film, toward the opposite side of the channel where the effluent is withdrawn at this elevated temperature. The heat content in the effluent can be recovered by passing the effluent through a heat exchanger to preheat the feed liquid prior to introduction into the still. However, since the efficiency of heat exchange between two liquids is inversely related to the difference in temperature between the liquids and introduction of feed liquid into a distillation stage at a temperature higher than the maximum temperature of that particular stage would constitute an inefficiency, the most efficient external heat exchange system would be required to accept the effluent from each distillation stage, transfer the heat content thereof to successive streams of feed liquid at gradually reduced temperature and direct to each distillation stage, a stream of feed liquid preheated to a temperature most appropriate for that stage. Obviously, such a heat exchange system would be very complex and expensive, particularly when compared with the simplicity and relatively low cost of the still itself.

The internal heat exchangs system of the invention provides these desirable features contributing to maximum efficiency of heat exchange between effluent and feed liquids and maximum overall efficiency of the still per se, with a simple and inexpensive structure already in existence and with a minimum of additional, inexpensive structure. The additional structure required, basically comprises a manifold designated 36, designed to direct the flow of two liquids (effluent and product) rather than a single (effluent) liquid, and means for recirculating a portion of the product. This manifold may be substantially the same as that provided for directing the circulation of the feed and product liquids, thereby further reducing necessary investment in equipment. Internal heat exchange is achieved by recirculating a part of the product liquid through each distillation stage in a direction counter to the direction of feed and effluent flow. The recirculated product liquid is introduced into each condensate channel of each stage at the side of the still at which the effluent is withdrawn. It will be seen from the temperature gradient diagram in FIG. 2 that the recirculated product liquid is introduced aproximately at ambient temperature and its temperature is raised rapidly, by transfer of heat from the effluent liquid, to the relatively uniform temperature characteristic of the condensate in the particular distillation stage. As the temperature of the recirculated product liquid is being raised, the temperature of the solution (termed "feed" when introduced and "effluent" when withdrawn) is rapidly reduced to approximately ambient temperature from the uniform temperature maintained throughout the major part of its passage from side to side of the still. As the product (condensate) liquid approaches the opposite side of the channel in the region in which the feed liquid is introduced, heat exchange again occurs with the temperature of the feed liquid being raised rapidly to the operating temperature of the particular distillation stage, and the temperature of the product liquid being reduced at a corresponding rate to approximately the temperature (ambient) of the incoming feed. By virtue of this arrangement, both the product and effluent liquids are substantially at the temperature of the incoming liquid, which, in turn, may be substantially at ambient temperature thereby eliminating heat loss from this source.

For most efficient heat transfer between the counter flow stream of effluent (and feed) and product (distillate) on opposite sides of a porous membrane, the rate of flow of the two streams should be equal to one another at every point. Accordingly, the recirculated product is introduced into the stream of each stage at a rate aproximating the rate of discharge of the effluent from that stage, and solvent extracted from the stream of feed liquid, transferred through the porous membrane and condensed as distillate, augments the stream of recirculated product liquid thereby maintaining the equality of flow rates from side to side of the still.

It will be noted from the temperature gradient diagrams that heat transfer between effluent and feed liquids is effected in two steps in different regions of each distillation stage. First, heat is transferred from effluent to recirculated product at one side of each distillation stage, and second, heat is transferred from the product to the incoming feed at the opposite side of the distillation stage. As heat is transferred from the effluent to the recirculated product, a small proportion of the product is vaporized and transferred through the adjacent porous membrane to the effluent stream and is lost. However, this is balanced by transfer of liquid from the feed to the product at the opposite side of the stream wherein heat is transferred from the product to the incoming feed, so that net liquid transfer in the regions of heat transfer between effluent and feed liquids is insignificant. The aggregate portion of each distillation stage which functions as a heat exchanger and produces no net product constitutes on the order of 20% of the overall area of the porous membrane through which liquid transfer occurs. Considering the high efficiency of heat transfer within the still and the relatively low cost of the components of the still as compared with an external heat exchanger, this system of internal heat exchange represents a substantial saving in equipment cost and provides for a substantial saving in operating expense.

Since certain changes may be made in the above method and apparatus without departing from the scope of the invention herein involved, it is intended that all matter contained in the above description or shown in the accompanying drawings shall be interpreted as illustrative and not in a limiting sense.

What is claimed is:

1. In a distillation process in which a distilland liquid is introduced into a first channel at one end thereof and is circulated in one direction through said channel in contact with one side of a microporous membrane, is heated during passage through said channel to vaporize said liquid and the vapor thereof is transferred across said membrane and condensed to form a distillate liquid which flows in the opposite direction through a second channel in contact with the opposite side of said membrane, transferring heat from effluent distilland liquid, immediately prior to withdrawal thereof from said first channel at the opposite end thereof, to incoming distilland liquid by withdrawing said distillate liquid from said second channel at one end of said second channel, introducing a portion of said distillate liquid into said second channel and recirculating said portion of said distillate liquid against said opposite side of said membrane in a direction opposite to the direction of flow of said distilland liquid.

2. A distillation process as defined in claim 1 wherein said portion of said distillate liquid is recirculated at a volumetric rate substantially equal to the volumetric rate of withdrawal of said effluent distilland liquid.

3. A distillation process as defined in claim 1 wherein said distilland liquid is introduced into and withdrawn from said first channel and contact with said membrane at approximately the same temperature and is circulated through said first channel in contact with the major portion of said membrane at a higher and generally constant temperature.

4. A distillation process as defined in claim 1 wherein heat is transferred from said distilland liquid to said recirculated portion of said distillate liquid during circulation of said distilland liquid in contact with said membrane near said opposite end of said first channel immediately prior to withdrawal of said effluent distilland liquid from contact with said membrane at said opposite end of said first channel to cool said distilland liquid substantially to the temperature at which said distilland liquid is initially introduced into contact with said membrane at said one end of said first channel.

5. A distillation process as defined in claim 4 wherein heat is transferred from said distillate liquid to said distilland liquid to raise the temperature of the latter to a predetermined level immediately following introduction of said distilland liquid into contact with said membrane at said one end of said first channel and the temperature of said distilland liquid is maintained substantially at said predetermined level until heat is transferred from said distilland liquid to said distillate liquid immediately prior to withdrawal of said distilland liquid from contact with said membrane at said opposite end of said first channel.

6. In a distillation process in which a distilland liquid is circulated as a first stream in contact with microporous membrane said first stream is caused to flow from one end of said membrane toward the other end thereof where said distilland liquid is withdrawn as effluent, heat is transferred to said first stream to vaporize said distilland liquid, the vapor of said liquid is transferred through said membrane to a second stream of distillate liquid in contact with the opposite side of said membrane and said distillate liquid is withdrawn from said second stream at said one end of said membrane, transferring heat from effluent distilland liquid to incoming distilland liquid by introducing and recirculating a portion of said distillate, withdrawn from said second stream at said one end of said membrane, into said second stream at said other end of said membrane and causing said second stream to flow in a direction opposite to the direction of flow of said first stream.

7. A distillation process as defined in claim 6 wherein said effluent distilland liquid is withdrawn from said first stream at said other end of said membrane and said distillate liquid is introduced into said second stream at said one end of said membrane at a volumetric rate substantially equal to the volumetric rate at which said effluent liquid is withdrawn.

8. A distillation process as defined in claim 6 wherein a plurality of said first streams are circulated as thin layers in substantially parallel relation, a plurality of said second streams are circulated as thin layers in substantially parallel relation intermediate said first streams.

9. A distillation process as defined in claim 8 wherein said layers comprising said first and second streams are arranged in stacked relation, heat is transferred to one of said layers comprising one of said first streams at one end of said stack of layers, and heat is transferred from one of said layers, at the opposite end of said stack, comprising one of said second streams.

10. A distillation process as defined in claim 6 wherein heat is transferred from said second stream to said first stream across said membrane in the region thereof adjacent said one end to raise the temperature of said first stream from an initial level to a higher predetermined level; and heat is transferred from said first stream to said second stream across said membrane in the region thereof adjacent said other end to lower the temperature of said first stream to approximately said initial level.

11. A distillation process as defined in claim 10 wherein said first stream is maintained substantially at said predetermined level during the major portion of its passage from end-to-end of said membrane.

12. A distillation process as defined in claim 10 wherein the temperature of said first stream is raised from and lowered to said initial level during passage of said first stream in contact with a minor portion of said membrane in said regions at said ends thereof.

13. A distillation process as defined in claim 10 wherein said regions at said ends of said membrane constitute on the order of 20% of the area of said membrane through which the vapor of said liquid is transferred.

14. A distillation process as defined in claim 10 wherein there is substantially no net liquid transfer across said membrane in said regions at said ends thereof.

15. Multiple effect distillation apparatus for extracting a vaporizable liquid from a liquid composition, said apparatus comprising, in combination:
   a plurality of distillation stages, each including a microporous membrane permeable to the vapor of said vaporizable liquid and means providing first and second channels for liquids on opposite sides of said membrane, said distillation stages being assembled with said membrane disposed to juxtaposed, spaced relation and with said first and second channels in alternating order;
   means for introducing said liquid composition into each of said first channels at one end thereof and circulating said liquid composition through said first channels in the same direction in contact with said membrane;
   means for transferring heat to said liquid composition in said first channels to vaporize said vaporizable liquid;
   means for transferring heat from liquid within said second channels to transfer said vapor across said membranes and condense said vapor to distillate liquid in contact with said membranes in said second channels;
   means for withdrawing said distillate liquid condensed in said second channels therefrom at the ends of said second channels opposite said one ends of said first channels; and
   means for introducing a portion of said liquid withdrawn from said second channels into said second channels at the other ends thereof and recirculating said liquid counter to the direction of flow of said liquid composition in said fihst channels.

16. Multiple effect distillation apparatus as defined in claim 15 wherein said first and second channels for said liquids are arranged in generally parallel relation.

17. Multiple effect distillation apparatus as defined in claim 16 including means for circulating said liquid composition through the first channels in generally parallel relation; and means for recirculating said vaporizable liquid through said second channels in generally parallel relation.

18. Multiple effect distillation apparatus as defined in claim 15 where said membranes and said channels defined thereby are generally rectangular in shape and said liquid composition and said vaporizable liquid are circulated in opposite directions from end-to-end of said channels.

References Cited
UNITED STATES PATENTS

| | | | |
|---|---|---|---|
| 2,803,589 | 8/1957 | Thomas | 203—11 |
| 2,861,038 | 11/1958 | Steinmann et al. | 210—23 |
| 3,062,905 | 11/1962 | Jennings et al. | 55—16 X |
| 3,129,145 | 4/1964 | Hassler | 202—174 |
| 3,148,141 | 9/1964 | Schonenberger et al. | 210—22 |
| 3,240,683 | 3/1966 | Rodgers | 202—173 |
| 3,288,686 | 11/1966 | Othmer | 203—11 |
| 3,298,932 | 1/1967 | Bauer | 203—10 X |
| 3,340,186 | 9/1967 | Weyl | 203—11 X |
| 3,361,645 | 1/1968 | Bodell | 203—10 |
| 3,406,096 | 10/1968 | Rodgers | 202—200 X |

NORMAN YUDKOFF, Primary Examiner

F. E. DRUMMOND, Assistant Examiner

U.S. Cl. X.R.

202—173, 236; 210—23